US009961932B2

(12) United States Patent
Weijs et al.

(10) Patent No.: US 9,961,932 B2
(45) Date of Patent: *May 8, 2018

(54) MUSCLE PRESERVATION IN OVERWEIGHT OR OBESE ADULT DURING WEIGHT LOSS PROGRAM

(71) Applicant: N.V. Nutricia, Zoetermeer (NL)

(72) Inventors: Peter Johan Marie Weijs, Ouderkerk aan de Amstel (NL); Johan De Vogel, Utrecht (NL); George Verlaan, Utrecht (NL); Marion Jourdan, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/897,176

(22) PCT Filed: Jun. 10, 2013

(86) PCT No.: PCT/NL2013/050411
§ 371 (c)(1),
(2) Date: Dec. 9, 2015

(87) PCT Pub. No.: WO2014/200332
PCT Pub. Date: Dec. 18, 2014

(65) Prior Publication Data
US 2016/0128372 A1 May 12, 2016

(51) Int. Cl.
*A23L 33/175* (2016.01)
*A23L 33/155* (2016.01)
*A23L 33/19* (2016.01)
*A23L 33/21* (2016.01)
*A23L 33/00* (2016.01)

(52) U.S. Cl.
CPC ............ *A23L 33/30* (2016.08); *A23L 33/155* (2016.08); *A23L 33/175* (2016.08); *A23L 33/19* (2016.08); *A23L 33/21* (2016.08); *A23V 2002/00* (2013.01)

(58) Field of Classification Search
USPC ........................................................ 514/176
See application file for complete search history.

(56) References Cited

U.S. PATENT DOCUMENTS

| 2004/0122097 A1* | 6/2004 | Verlaan ................ A61K 31/198 514/561 |
| 2006/0275506 A1 | 12/2006 | Fisher et al. |
| 2009/0042770 A1* | 2/2009 | Bastian ................ A61K 31/195 514/1.1 |
| 2009/0220637 A1* | 9/2009 | Roessle ................... A23L 1/296 426/2 |
| 2010/0124587 A1 | 5/2010 | Heuer et al. |

FOREIGN PATENT DOCUMENTS

| EP | 1 330 957 A2 | 7/2003 |
| EP | 1 712 140 A1 | 10/2006 |
| EP | 2 036 552 A1 | 3/2009 |
| JP | 2008-237070 A | 10/2008 |
| WO | WO-01/60378 A2 | 8/2001 |
| WO | WO-2004/026294 A1 | 4/2004 |
| WO | WO-2005/039597 A2 | 5/2005 |
| WO | WO-2006/026458 A2 | 3/2006 |
| WO | WO-2006/062273 | 6/2006 |
| WO | WO-2007/043870 A1 | 4/2007 |
| WO | WO-2007/057748 A2 | 5/2007 |
| WO | WO-2008/049984 A2 | 5/2008 |
| WO | WO-2008/115563 A1 | 9/2008 |
| WO | WO-2009/113858 A1 | 9/2009 |
| WO | WO-2010/143939 A1 | 12/2010 |
| WO | WO-2010/143947 A1 | 12/2010 |
| WO | WO-2011/011252 A1 | 1/2011 |
| WO | WO-2012/005582 A1 | 1/2012 |
| WO | WO-2012/024611 A1 | 2/2012 |
| WO | WO-2012/091571 A2 | 7/2012 |

OTHER PUBLICATIONS

Koopman et al ("Combined ingestion of protein and free leucine with carbohydrate increases postexercise muscle protein synthesis in vivo in male subjects" (2004) Am J Physiol Endocrinol Metab 288: E645-E653).*
Siddiqui (Dietary Intervention with Vitamin D, Calcium and Whey Protein reduced Fat mass and Increased Lean Mass in Rats, Nutr Res, 2008; 28(11); pp. 783-790).*
Jarosz et al., "Sarcopenic Obesity: An emerging cause of frailty in older adults", Geriatric Nursing, Jan. 2009, vol. 30, No. I, pp. 64-70.
Villareal et al., "Obesity in older adults: technical review and position statement of the American Society for nutrition and NAASO, The Obesity Society", Obesity Research, Nov. 2005, vol. 13, No. 11, pp. 1849-1863.
International Search Report issued in International Patent Application No. PCT/NL2013/050411 dated Sep. 10, 2013.
Ames et al., "Mineral and vitamin deficiencies can accelerate the mitochondrial decay of aging", Molecular Aspects of Medicine, 2005, vol. 26, pp. 363-378.
Anthony et al., "Leucine stimulates translation initiation in skeletal muscle of postabsorptive rats via a rapamycin-sensitive pathway", The Journal of Nutrition, 2000, vol. 130, pp. 2413-2419.
Bartali et al., "Low Nutrient is an Essential Component of Frailty in Older Persons," Journal of Gerontology: Medical Sciences, 2006, pp. 589-593, vol. 61A, No. 6, The Gerontological Society of America.
Bauer et al., "Sarcopenia in nursing home residents", J. Am. Med. Dir. Assoc., 2008, vol. 9, pp. 545-551.

(Continued)

*Primary Examiner* — Kathrien A Cruz
(74) *Attorney, Agent, or Firm* — Gilberto M. Villacorta; Sunit Talapatra; Foley & Lardner LLP

(57) ABSTRACT

The invention pertains to the use of a composition comprising per serving between 50-300 kcal; between 10 g and 35 g proteinaceous matter; and at least 2.5 microgram vitamin D, for the manufacture of a nutritional product for (a) the treatment or prevention of muscle mass decrease, (b) stimulation of muscle mass increase; or (d) stimulating muscle mass preservation, in obese or overweight adults of at least 40 years of age participating in a weight loss program. The inventors surprisingly found that nutritional supplementation with a low-caloric composition rich in protein, particularly whey protein and leucine, compared to an iso-caloric control supplement without protein, synergistically leads to preservation of muscle mass during a weight loss program involving a hypocaloric diet and a resistance exercise program in overweight/obese older adult.

26 Claims, 1 Drawing Sheet

(56) References Cited

OTHER PUBLICATIONS

Bendahan, D., et al."Citrulline/malate promotes aerobic energy production in human exercising muscle," Br J Sports Med, 2002, pp. 282-289, vol. 36, British Association of Sport and Exercise Medicine in association with the National Sports Medicine Institute.
Birge et al., "25-Hydroxycholecalciferol stimulation of muscle metabolism", The Journal of Clinical Investigation, Nov. 1975, vol. 56, pp. 1100-1107.
Bischoff-Ferrari et al., "Effect of vitamin D on Falls: a meta-analysis", JAMA, Apr. 2004, vol. 291, No. 16, pp. 1999-2006.
Bouillon, et al.,"Vitamin D Deficiency," The New England Journal of Medicine, 2007, pp. 1980-1982, vol. 357, No. 19, Massachusetts Medical Society.
Cuthbertson et al., "Anabolic signaling deficits underlie amino acid resistance of wasting, aging muscle," The FASEB Journal, 2004, pp. 1-22.
Dardevet et al., "Stimulation of in vitro rat muscle protein synthesis by leucine decreases with age", The Journal of Nutrition, 2000, vol. 130, pp. 2630-2635.
Dawson-Hughes, "Serum 25-hydroxyvitamin D and functional outcomes in the elderly", The American Journal of Clinical Nutrition, 2008, vol. 88(suppl), pp. 537S-540S.
Dietary Reference Intakes for Japanese (2005), Ministry of Health, Labor and Welfare, Japan, p. 83.
Directive 2002/46/EC of the European Parliament and of the Council, Article 4 & Annex, Jun. 2002.
Guillet, CH RI Stelle, et al., Impaired anabolic response of muscle protein synthesis is associated with S6K1 dysregulation in elderly humans, The FASEB Journal, 2004, pp. 1-16.
Holick, "Resurrection of vitamin D deficiency and rickets", The Journal of Clinical Investigation, Aug. 2006, vol. 116, No. 8, pp. 2062-2072.
Katsanos et al., "A high proportion of leucine is required for optimal stimulation of the rate of muscle protein synthesis by essential amino acids in the elderly", Am. J. Physiol. Endocrinol. Metab., 2006, vol. 291, pp. E381-E387.
Lesser et al.,"Nutritional Situation of the Elderly in Eastern/Baltic and Central/Western Europe—The Ageing Nutrition Project," Annals of Nutrition & Metabolism, 2008, pp. 62-71, vol. 52, suppl. 1, S. Karger AG, Basel.
Leterme et al., "Amino acid composition of pea (*Pisum sativum*) proteins and protein profile of pea flour", J. Sci. Food Agric., 1990, vol. 53, pp. 107-110.
Marzani, et al., "Antioxidant Supplementation Restores Defective Leucine Stimulation of Protein Synthesis in Skeletal Muscle from Old Rats," The Journal of Nutrition, 2008, pp. 2205-2211, vol. 138, American Society for Nutrition.
Montero-Odasso et al., "Vitamin D in the aging musculoskeletal system: An authentic strength preserving hormone", Molecular Aspects of Medicine, 2005, vol. 26, pp. 203-219.
Morley et al., "Nutritional recommendations for the management of Sarcopenia", J. Am. Med. Dir. Assoc., Jul. 2010, vol. 11, No. 6, pp. 391-396.
NIH Office of Dietary Supplements, "Vitamin D", 2009, pp. 1-11.
Paddon-Jones et al., "Differential stimulation of muscle protein synthesis in elderly humans following isocaloric ingestion of amino acids of whey protein", Experimental Gerontology, 2006, vol. 41, pp. 215-219.
Perez-Guisado et al., Citrulline Malate Enhances Athletic Anaerobic Performance and Relieves Muscle Soreness, Journal of Strength and Conditioning Research, 2010, vol. 24, No. 5, National Strength and Conditioning Association.
Pfeifer et al.,"Vitamin D and Muscle Function," Osteoporosis International, 2002, pp. 187-194, vol. 13, International Osteoporosis Foundation and National Osteoporosis Foundation.
Rieu et al., "Leucine supplementation improves muscle protein synthesis in elderly men independently of hyperaminoacidaemia", J. Physiol., 2006, vol. 575.1, pp. 305-315.
Rolland, et al., "Sarcopenia: its assessment, etiology, pathogenesis, consequences and future perspectives," The Journal of Nutrition, Health & Aging, 2008, pp. 433-450, vol. 12, No. 7.
Salles et al., "1,25(OH)2-vitamin D3 enhances the stimulating effect of leucine and insulin on protein synthesis rate through Akt/PKB and mTOR mediated pathways in murine C2C12 skeletal myotubes", Mol. Nutr. Food Res., 2013, vol. 57, pp. 2137-2146.
Semba, "Low serum micronutrient concentrations predict frailty among older women living in the community," Journal of Gerontology: Medical Sciences, 2006, pp. 594-599, vol. 61A, No. 6, The Gerontological Society of America.
Seshadri et al., "Plasma homocysteine as a risk factor for dementia and alzheimer's disease," The New England Journal of Medicine, 2002, pp. 476-483, vol. 346, No. 7, Massachusetts Medical Society.
Shen et al., "Insulin and IGF-I stimulate the formation of the eukaryotic initiation factor 4F complex and protein synthesis in C2C12 myotubes independent of availability of external amino acids", Journal of Endocrinology, 2005, vol. 185, pp. 275-289.
Smith et al., "Measurement of human mixed muscle protein fractional synthesis rate depends on the choice of amino acid tracer", Am. J. Physiol. Endocrinol. Metab., 2007, vol. 296, pp. E666-E671.
Thompson et al., "Milk proteins: from expression to food", Food Science and Technology, International Series, Academic Press, 2009, 5 pgs.
Van Laere, "Degradation of Structurally Different Non-Digestible Oligosaccharides by Intestinal Bacteria: Glycosylhydrolases of Bifidobacterium adolescentis," PHO-thesis 2000, pp. 1-152, Wageningen Agricultural University, Wageningen, The Netherlands.
Visser et al., "Low vitamin D and high parathyroid hormone levels as determinants of loss of muscle strength and muscle mass (Sarcopenia): The longitudinal aging study Amsterdam", The Journal of Clinical Endocrinology & Metabolism, 2003, vol. 88, No. 12, pp. 5766-5772.
Volek("Leucine triggers muscle growth" Nutrition Express. downloaded from http://www.nutritionexpress.com/article index/protein/showarticle.aspx?id=807 on Feb. 14, 2018).
Wicherts et al., "Vitamin D status predicts physical performance and its decline in older persons," The Journal of Clinical Endocrinology & Metabolism, 2007, pp. 2058-2065, vol. 92, No. 6, The Endocrine Society.

* cited by examiner

MUSCLE PRESERVATION IN OVERWEIGHT OR OBESE ADULT DURING WEIGHT LOSS PROGRAM

CROSS-REFERENCE TO RELATED APPLICATION

This application is the National Phase of International Patent Application No. PCT/NL2013/050411, filed Jun. 10, 2013 published on Dec. 18, 2014 as WO 2014/200332 A1, which is hereby incorporated by reference in its entirety.

The invention rests in the field of muscle mass preservation, particularly in obese or overweight adult, participating in a weight loss program.

BACKGROUND OF THE INVENTION

The prevalence of obesity among older adult is rising. At present, about 70% of the population above 40 years has overweight and more than 30% of the population above 40 years of age is obese. Obesity is clearly related to metabolic risk factors for cardiovascular diseases and diabetes mellitus. In addition, body weight and body mass index (BMI) play a significant role in non-fatal physical disability in the older adult. In older adult, controversy exists about the health benefits of voluntary weight loss. Weight loss in older persons leads to better metabolic control with better glucose regulation, lower blood pressure, better pulmonary function and improved functional ability. However, weight loss not only results in a decrease in fat mass, but also in a decrease of lean mass: about 25% of lost weight is loss of lean mass. It is therefore possible that weight loss in overweight or obese older adult in the long run accelerates the age-related loss of muscle mass, i.e. sarcopenia, and subsequently a decreased physical functioning. Because the loss of muscle mass is associated with decreased physical functioning the present inventors believe there is a need to minimize loss of muscle mass during a weight loss program in overweight or obese older adult and thus for a new method of treatment of overweight/obese older adult.

WO2012024611 describes the use beta-alanine for the treatment of muscular disorders and for the improvement of muscle function in older adult.

WO2011011252 discloses compositions in combination with exercise to attenuate the loss of functional status in elderly. The exercise is not part of an attempt to address obesity. The effect of a weight loss program on muscle mass is not disclosed.

WO2012091571 describes a combination of components including PUFA, vitamin B and choline for the prevention and treatment of frailty.

WO2007043870 describes a composition comprising proteinaceous matter, said proteinaceous matter providing at least 24.0% of the energetic value of the composition (en %) and at least 12 wt. % based on proteinaceous matter leucine in the manufacture of a medicament for the treatment of a subject suffering from insulin resistance including subjects suffering from obesity.

D T. Villareal, et al. Am J Clin Nutr 2005; 82:923-34 *Obesity in older adults: technical review and position statement of the American Society for Nutrition and NAASO* describes the problem of obesity in older persons and discusses the current therapeutic tools available for weight management in older persons; 1) lifestyle intervention involving diet, physical activity, and behaviour modification; 2) pharmacotherapy; and 3) surgery.

Muscle mass preservation during a weight loss program is increasingly important in older adults. Resistance exercise is a tool sometimes applied for supporting the preservation of muscle mass or stimulating the increase in muscle mass, during a weight loss program. However, even resistance exercise as part of a weight loss program as it is used in the art yields loss of muscle mass. Therefore, the art is in need of ways to preserve muscle mass preservation during a weight loss program, particularly nutritional compositions with proven efficacy to preserve muscle mass for the overweight or obese adult in a weight loss program.

SUMMARY OF THE INVENTION

The inventors hypothesized that weight loss in obese older adults needs more than hypocaloric diet and/or physical exercise, and investigated this in clinical trials which are reported further below. The inventors surprisingly found that nutritional supplementation with a low-caloric composition rich in protein, particularly whey protein and leucine, compared to an iso-caloric control supplement without protein, synergistically leads to preservation of muscle mass during a weight loss program involving a hypocaloric diet and a resistance exercise program in overweight/obese older adult. Reference is made to FIGS. 1 and 2. A hypocaloric diet in combination with resistance exercise was not found sufficient to preserve muscle mass, where the specific hypocaloric composition according to the invention was sufficient. There is no pointer in the prior art that muscle mass during a hypocaloric weight loss program in overweight/obese older adults could be preserved or improved when such exercise is performed in conjunction with the specific nutritional intervention further defined below.

In one aspect the invention pertains to the use of a composition comprising per serving between 50-300 kcal; between 10 g and 35 g proteinaceous matter; and at least 2.5 microgram vitamin D, for the manufacture of a nutritional product for muscle mass preservation or for stimulation of muscle mass increase, in adults of at least 40 years of age participating in a weight loss program. Worded differently, the invention pertains to a nutritional composition with the above characteristics, in conjunction with a weight loss program for use in muscle mass preservation or stimulation of muscle mass increase in older adults of at least 40 years of age. Preferably the composition is administered at once to adults that suffer from overweight or obesity.

In another aspect, the invention pertains to a nutritional composition for (use in) muscle mass preservation or for (use in) stimulation of muscle mass increase, in older obese or overweight adults of at least 40 years of age, participating in a weight loss program involving a physical exercise regimen and a hypo-caloric dietary regimen, wherein said adults are fed 25-100 g dry weight of the nutritional composition daily, in a single dose or as multiple doses, wherein the nutritional composition has an energy density of between 200 and 500 kcal per 100 g dry weight, and, in terms of dry weight: between 45 and 55 wt % proteinaceous matter, including between 0.5 and 4 wt % leucine as free amino acid, peptide and/or salt thereof, less than 50 wt % carbohydrates, and between 2 and 15 wt % dietary fiber, between 5 and 75 microgram vitamin D, said composition enterally fed in conjunction with said physical exercise regimen and said hypocaloric dietary regimen. It is preferred that the serving size is between 50 and 300 kcal of the nutritional composition. Preferably the serving is administered at once as a single shot.

The invention also pertains to the use of the above compositions according to the present invention in the manufacture of a product for muscle mass preservation or stimulation of muscle mass increase in an older obese or overweight adult of at least 40 years of age who participates in a weight loss program. Worded differently, the invention also pertains to a method for muscle mass preservation or stimulation of muscle mass increase in an older obese or overweight adult of at least 40 years of age who participates in a weight loss program, wherein said method involves feeding a nutritional composition as characterized above to said adult in conjunction with a weight loss program, preferably the weight loss program involving a physical exercise regimen and a hypocaloric diet.

The older obese or overweight adult is preferably suffering from a disease or condition selected from the group consisting of sarcopenia, overweight, obesity, sarcopenic obesity, pre-diabetes type 2, diabetes type 2, pre-frailty or frailty. In one embodiment, the obese or overweight subject is at risk of or suffering from sarcopenia.

LIST OF EMBODIMENTS

1. Use of a composition comprising per serving between 50-300 kcal; between 10 g and 35 g proteinaceous matter; and at least 2.5 microgram vitamin D, for the manufacture of a nutritional product for
   a. the treatment or prevention of muscle mass decrease, or
   b. stimulation of muscle mass increase, or
   c. stimulating muscle mass preservation,
   in obese or overweight adults of at least 40 years of age participating in a weight loss program.
2. Use according to embodiment 1 wherein the adult is suffering from a disease or condition selected from the group consisting of sarcopenia, overweight, obesity, sarcopenic obesity, pre-diabetes type 2, diabetes type 2, pre-frailty or frailty.
3. Use according to any one of the preceding embodiments, wherein the treatment comprises a daily dose of 1 to 4 servings.
4. Use according to any of the preceding embodiments, wherein the weight loss program comprises a hypocaloric diet in combination with an exercise regimen.
5. Use according to embodiment 4, wherein said hypocaloric diet involves a daily energy uptake of less than the daily energy expenditure (TEE) of the older adult, wherein TEE is preferably assessed by means of the doubly labelled water method (TEEDLW).
6. Use according to embodiment 5, wherein the hypocaloric diet provides 50-95%, preferably 60-90%, more preferably 70-90% of the TEE of the obese or overweight adult.
7. Use according to any of embodiments 4-6, wherein said exercise regimen involves resistance exercise training.
8. Use according to any of the preceding embodiments, wherein the serving is administered as a single shot wherein the serving is consumed within 15 minutes, more preferably within 10 minutes, even more preferably within 5 minutes.
9. Use according to any of the preceding embodiments, wherein at least 13 wt %, preferably between 13 and 20 wt % of the total proteinaceous matter is leucine.
10. Use according to any one of the preceding embodiments, wherein the composition comprises per serving at least 0.5 gram of at least one compound selected from the group consisting of free leucine, salts of free leucine, or metabolites of leucine, or salts of metabolites of leucine, wherein the metabolite is preferably selected from the group consisting of β-hydroxy-β-methylbutyrate, β-hydroxy-β-methylbutyrate free acid, calcium-β-hydroxy-β-methylbutyrate, hydroxyl iso caproic acid and ketoisocaproic acid.
11. Use according to embodiment 10, wherein the free leucine, salts thereof or its metabolites are encapsulated.
12. Use according to any of the preceding embodiments, wherein the composition further comprises at least 20 en % carbohydrates and/or fat.
13. Use according any of the preceding embodiments, wherein the carbohydrate comprises of at least 10 wt % based on the total carbohydrate matter of a carbohydrate with a glycemic index below 70.
14. Use according any of the preceding embodiments, wherein the fat source comprises at least 30 weight % of unsaturated fatty acids and at least 15 weight % of polyunsaturated acids of total fat in the composition.
15. Use according to any one of the preceding embodiments, wherein the proteinaceous matter comprises at least 60 wt % mammalian whey, preferably bovine whey.
16. Use according to any of the preceding embodiments wherein the carbohydrate comprises dietary fiber.
17. Use according to embodiment 16 wherein the serving comprises between 0.5 and 6 gram dietary fiber, wherein the dietary fiber comprises at least one fiber selected from the group consisting of galactooligosaccharides (GOS), fructooligosaccharides (FOS), inulin and pectin oligosaccharides.
18. A method for preserving muscle mass or stimulation of muscle mass increase or reducing the risk of sarcopenia in obese or overweight adults of at least 40 years of age participating in a weight loss program, wherein the method involves feeding a nutritional composition to said adult in conjunction with a weight loss program, said weight loss program involving a physical exercise regimen and a hypocaloric dietary regimen, wherein said adults are fed 25-100 g dry weight of the nutritional composition daily, wherein the nutritional composition has an energy density of between 200 and 500 kcal per 100 g dry weight, and in terms of dry weight of the composition; between 45 and 55 wt % proteinaceous matter, including 0.5 and 4 wt % leucine as free amino acid, peptide and/or salt, less than 50 wt % carbohydrates, between 5 and 75 microgram vitamin D, and optionally between 2 and 15 wt % dietary fiber comprising galactooligosaccharides (GOS), fructooligosaccharides (FOS) and/or pectin oligosaccharides, said composition given to said adults in conjunction with the physical exercise regimen and hypocaloric dietary regimen.
19. The method according to embodiment 18, wherein the nutritional composition comprises per serving between 50 and 300 kcal.

DETAILED DESCRIPTION OF THE INVENTION

Figure 1:
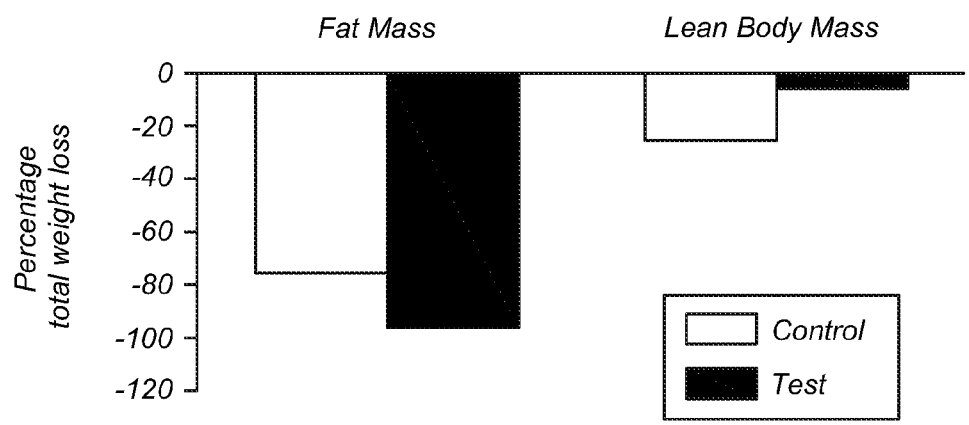
FIG. 1 shows fat mass and lean body mass loss calculated as a percentage of total body weight loss at 13 weeks after intervention. The group receiving the test product lost relatively more fat and less lean body mass compared to the control.

Obesity is defined as an unhealthy excess of body fat, which increases the risk of medical illness and premature mortality. BMI, calculated as body weight (in kg) divided by the square of height (in m), has been widely used and accepted as a simple method to classify medical risk by weight status. The classification 'overweight' is reserved for BMI of 25-30, while 'obesity' is characterized by a BMI of 30 or higher. The prevalence of obesity (defined as BMI of 30 or higher) among older adult is rising in The Netherlands. At present, more than 15% of the population above 65 years of age is obese. As the prevalence of both aging and obesity is increasing, obese older adult are a significant target population for research. Obesity is clearly related to metabolic risk factors for cardiovascular diseases and diabetes mellitus. In addition, body weight and body mass index (BMI) play a significant role in non-fatal physical disability in the older adult. In older adult, controversy exists about the health benefits of voluntary weight loss. Weight loss not only results in a decrease in fat mass, but also in a decrease of lean body mass: about 25% of the weight loss is estimated to be caused by the loss of lean body mass. Lean body mass is defined as the body mass without the mass of adipose and bone tissue. Skeletal muscle mass or muscle mass is the body tissue contributing most to the total lean body mass. It is possible that weight loss in obese older adult in the long term accelerates the age-related loss of muscle mass, i.e. sarcopenia, and subsequently a decreased physical functioning. Although obese older adult may benefit from weight loss, care should be taken that such weight loss therapy minimizes loss of muscle mass, because loss of muscle mass is associated with decreased strength and physical functioning.

The inventors found that a nutritional supplement, specifically designed for older adults that suffer from sarcopenia, is particularly useful in minimizing muscle loss during a weight loss program involving exercise or training. The results are reported in the clinical evidence further below: The problem of decreased muscle mass during a weight loss program with older adults was confirmed even when exercise is included in the program, and the effectiveness of the nutritional treatment in conjunction with such a weight program according to the present invention was evidenced. Surprisingly the older adult that consumed the product according to the invention during their weight loss program had a much lower decrease in muscle mass than the iso-caloric control group.

In the context of this application, the term "at least" also includes the starting point of the open range. For example, an amount of "at least 95 weight %" means any amount equal to 95 weight % or above.

The term 'proteinaceous matter' comprises all protein, in intact or hydrolyzed form, di- and tripeptides as well as free amino acids, and salts thereof. It includes a protein or any part derivable of a protein, such as but not limited to non-hydrolyzed protein, native protein, hydrolyzed protein, peptides, such as oligopeptides and dipeptides, and amino acids. Leucine as non-protein bound free amino acid is part of proteinaceous matter, but for instance citrulline, and creatine would not fall within the definition.

With the term "muscle mass" referral is made to skeletal muscle mass and/or appendicular muscle mass, preferably both. Reliable measures of body mass/muscle as known to the skilled person are based on dual-energy X-ray absorptiometry (DEXA or DXA) imaging (eg, for appendicular skeletal muscle mass) or magnetic resonance imaging (MM) and computed tomography (CT) (eg, for mid-thigh cross-sectional area). DXA imaging allows delineation of body mass as bone mineral, fat, and fat-free soft tissue; in the arms and legs, non-bone, non-fat tissues are assumed to be appendicular skeletal muscle mass (ASM).

In the context of this application, the older adult is preferably an older adult human of the age of 45 years or more, more preferably of 50 years or more, in particular of the age of 55 or more, more in particular of the age of 60 or more. It is reiterated that muscle mass decline already starts at earlier age of about 40 years. As explained above, the older adult human beings are particularly at risk of muscle mass deterioration, physical frailty and sarcopenia when they are on a weight loss program.

In the context of this application the term "daily dose" means the serving size indicating the amount of the nutrition information which is administered to the older adult per day. Preferably a daily dose is limited to between 50 and 600 kcal, even more preferably between 100 and 300 kcal per day. Preferably the daily dose is given in 1 to 4 servings per day, more preferably 1 or 2 servings, or most preferably 1 serving per day.

Older adults have a lower sensitivity of muscle protein synthesis to dietary protein stimulation. A fast and high rise in circulating plasma amino acid and related high amino acid availability to the muscles is necessary to efficiently stimulate muscle protein synthesis at the post-prandial state in older adults. To overcome the aging-induced higher threshold for circulatory amino acids in the blood to stimulate muscle protein anabolism it is preferred that the nutritional composition of the invention comprises predominantly fast-digestible protein (referring to the rate of appearance in the circulation of the amino acids following whey ingestion) and to consume the nutritional composition at once in a single shot per day. With 'fast-digestible protein' it is understood to include hydrolyzates of any protein source (including vegetable proteins and milk protein sources), free amino acids, and/or whey protein. Since the taste of whey protein is the best, this protein source is preferred.

In the context of this application the term serving or administration at once means that the serving is preferably consumed as a shot within 15 minutes, more preferably within 10 minutes, even more preferably within 5 minutes.

In the context of the invention, with a 'weight loss program' it is understood a program involving (a) a dietary calorie restriction (i.e. a hypocaloric dietary regimen) in conjunction with (b) a physical exercise regimen.

The older adults are advised to adhere to a protocol of dietary restriction in terms of limited daily caloric intake, i.e. a 'hypo-caloric' or low-caloric dietary regimen. According to dietary guidelines, such a hypo-caloric dietary regimen preferably involves a restriction of the total daily caloric intake of a human being that is 10-50% of his or her average total daily intake. The average total daily intake of the target group of older adults is well-documented, and it is considered within the ambits of the skilled person's knowledge to determine a suitable meal plan and the caloric restrictions of a hypocaloric dietary regime. According to FAO publication; Human energy requirements, Report of a Joint FAO/WHO/UNU Expert Consultation Rome, 17-24 Oct. 2001 the energy requirements of humans have been established. As summarised in the below table, cited from this report, the energy requirements depend on the age, bodyweight (BMI), and physical activity level (PAL). The content of the above report is herewith considered incorporated by reference. According to the present invention the term "hypocaloric diet" means a diet that delivers the daily energy expenditure (total energy expenditure; TEE) or less (in calories) when calculated without the physical exercise program. TEE, may also be referred to in the art as the 'TDEE' (i.e. total daily energy expenditure). For instance, an overweight male between 40 and 50 years old has a TEE of 37 kcal/kg body weight. According to the invention, a hypo caloric diet will thus provide at most 37 kcal/kg body weight. Dependent on patient's age and gender, the skilled person can straightforwardly calculate the caloric consequences of a hypo-caloric diet for an overweight or obese person from these tables. It is preferred that the hypo-caloric diet provides 50-95%, preferably 60-90%, more preferably 70-90% of the TEE of the targeted subject. Additionally or alternatively, in terms of absolute numbers the hypo-caloric diet may involve a caloric content of more than 500 kcal below estimated needs of the targeted subject, preferably assessed in terms of TEE or in accordance with WHO guidelines, more preferably a hypo-caloric diet of 600-1000 kcal below estimated needs of the targeted subject (preferably assessed through TEE or WHO guidelines), dependent on the subjects age, gender, BMI and daily activities. TEE may for instance be assessed by means of the doubly labeled water method (TEEDLW). This method is widely regarded as the 'gold standard' for estimating TEE in free-living individuals. Reference is made to for instance Melanson et al. "*Physical activity assessment: a review of methods*" Crit Rev Food Sci Nutr 1996; 36: 385-396, its contents herein incorporated by reference.

Daily Energy Expenditure, Basal Metabolic Rate and Physical Activity Level Measured in United States Adults serving muscle mass and ameliorating the progression of sarcopenia. Therefore, in one embodiment, the physical exercise regimen does not involve endurance training. It is preferred that the physical exercise regimen involves at least resistance exercise, due to its well known effects on muscle mass maintenance and stimulation of muscle mass increase. Activity patterns could vary from engaging in the above one or more physical activities for a minimum of 1 time per week but preferably 2 times per week and more preferably 3 or more times per week, including at least some form of resistance exercise. There are ACSM/AHA Guidelines for flexibility, endurance and resistance exercise which can be of help to the skilled person to determine a suitable physical exercise regimen, and these are considered incorporated by reference here. The physical exercise regimen involves daily physical exercise activities as described above, preferably comprising resistance exercise. The physical exercise regimen is preferably in accordance with ACSM/AHA guidelines, their contents herein incorporated by reference.

Depending on the design of the hypocaloric diet, within the weight loss program, the composition for use according to the invention preferably has a low caloric content, i.e. preferably not exceeding 150 kcal/100 ml (i.e. at most 1.5 kcal per ml) or preferably not exceeding 120 kcal/100 ml (i.e. at most 1.2 kcal per ml). In an embodiment the composition preferably has per serving a caloric content between 75-300 kcal preferably between 100 and 250 kcal, particularly 100-200 kcal of the composition administered to the older adult. In one embodiment, the composition has a caloric content of at most 300, preferably between 50 and 250 kcal fed to the older adult per day. In one embodiment, the composition has a caloric content of at most 250, preferably between 70 and 200 kcal per daily dose. A serving preferably involves 100-200 ml, more preferably 125-175 ml; and/or 20-45 g dry matter, more preferably 25-40 g dry

| Age | | Weight | TEE measured with DLW | | | | BMR measured individually | | | | |
|---|---|---|---|---|---|---|---|---|---|---|---|
| years | No. | kg | MJ | kJ/kg | kcal | kcal/kg | MJ | kJ/kg | kcal | kcal/kg | PAL |
| Overweight men | | | | | | | | | | | |
| 20-30 | 10 | 89.9 | 13.5 | 150 | 3 224 | 36 | 7.8 | 86 | 1 858 | 21 | 1.90 |
| 30-40 | 53 | 102.4 | 15.5 | 151 | 3 703 | 36 | 8.6 | 84 | 2 046 | 20 | 1.81 |
| 40-50 | 37 | 94.6 | 14.5 | 153 | 3 465 | 37 | 7.9 | 83 | 1 878 | 20 | 1.88 |
| 50-60 | 17 | 100.3 | 14.5 | 144 | 3 458 | 34 | 7.8 | 77 | 1 857 | 19 | 1.88 |
| 60-70 | 30 | 87.8 | 11.9 | 136 | 2 851 | 32 | 7.1 | 80 | 1 687 | 19 | 1.71 |
| 70-80 | 34 | 84.8 | 11.0 | 129 | 2 624 | 31 | 7.2 | 85 | 1 713 | 20 | 1.55 |
| 80-90 | 7 | 78.1 | 9.6 | 123 | 2 294 | 29 | 6.5 | 83 | 1 558 | 20 | 1.47 |
| >90 | 2 | 77.5 | 7.8 | 101 | 1 863 | 24 | 6.5 | 84 | 1 550 | 20 | 1.29 |
| Overweight women | | | | | | | | | | | |
| 20-30 | 33 | 83.4 | 11.4 | 136 | 2 713 | 33 | 6.4 | 77 | 1 536 | 18 | 1.78 |
| 30-40 | 41 | 83.9 | 11.7 | 139 | 2 794 | 33 | 6.6 | 79 | 1 587 | 19 | 1.78 |
| 40-50 | 14 | 96.9 | 12.7 | 131 | 3 032 | 31 | 7.1 | 73 | 1 696 | 18 | 1.80 |
| 50-60 | 29 | 83.3 | 9.8 | 118 | 2 349 | 28 | 5.9 | 71 | 1 409 | 17 | 1.68 |
| 60-70 | 46 | 78.2 | 8.6 | 110 | 2 061 | 26 | 5.7 | 74 | 1 374 | 18 | 1.52 |
| 70-80 | 19 | 69.3 | 7.8 | 113 | 1 868 | 27 | 5.2 | 75 | 1 234 | 18 | 1.51 |
| 80-90 | 6 | 62.8 | 7.3 | 116 | 1 748 | 28 | 5.2 | 82 | 1 233 | 20 | 1.42 |
| >90 | 7 | 74.8 | 7.4 | 99 | 1 766 | 24 | 5.6 | 75 | 1 332 | 18 | 1.33 |

The physical exercise regimen involves any physical exercise or activity other than or in addition to daily living activities that contributes to a negative energy balance or an activity that costs calories during that activity. Physical activity examples can be, but not limited to, resistance exercise, aerobic exercise or flexibility training or combinations thereof. Endurance training is not recommended, at least not as the sole source of physical exercise, for pre-matter. Unless specified otherwise, as a guide the skilled person could convert the relative amounts of the various ingredients in terms of caloric content to volume assuming a serving of 150 kcal and 150 ml.

An embodiment of the invention thus pertains to a nutritional composition for use in muscle mass preservation or stimulation of muscle mass increase, in older obese or overweight adults of at least 40 years of age participating in a weight loss program, said composition comprising per daily dose between 10 g and 35 g proteinaceous matter, at least 2.5 microgram vitamin D and between 50-300 kcal energy content, wherein preferably at least 13 wt %, more preferably between 13 and 20 wt % of the total proteinaceous matter is leucine (as the sum of all leucine bound or in free form).

An embodiment of the invention thus pertains to a nutritional composition for use in muscle mass preservation or stimulation of muscle mass increase or reducing the risk of sarcopenia, in older obese or overweight adults of at least 40 years of age participating in a weight loss program, comprising per serving between 50-300 kcal; between 10 g and 35 g proteinaceous matter; and at least 2.5 microgram vitamin D, wherein the proteinaceous matter preferably comprises at least 50 wt % whey protein and wherein preferably at least 13 wt %, more preferably between 13 and 20 wt % of the total proteinaceous matter is leucine (as the sum of all leucine bound or in free form).

Daily Micro-Nutritional Requirements

Since food intake is reduced during a weight loss program the composition according to the invention is preferably enriched with nutritional ingredients like vitamins and minerals. In a preferred embodiment according to the invention the composition used in the weight loss program comprises all nutritional ingredients recommended according to the nutritional guidelines for the older adults including calcium source and vitamin D source. Preferably a serving of the composition for use according to the invention comprises calcium in an amount between 150 and 1000 mg and/or at least 2.5 microgram vit D, preferably between 2.5 and 60 microgram and even more preferably between 5 and 50 microgram vit D (per serving). The inventors believe that in particular high doses of vitamin D can prevent muscle loss during a weight loss program. The RDA [recommended daily allowance] of vitamin D is about 15 microgram on basis of low sun exposure. Due to low sun light exposure of many older adults the inventors believe that high doses of vit D are particularly useful in the older adult target group. A serving for use according to the invention preferably comprises at least 2.5, more preferably at least 5 and even more preferably at least 10 microgram vitamin D per 100 kcal of the serving. The term 'vitamin D' in the context of the invention refers to all physiological forms of vitamin D and its metabolite (i.e. 25 OHD), either $D_1$, $D_2$, $D_3$ or $D_4$, in particular $D_2$ and $D_3$, or any mixture thereof. In the context of this application, 1 IU of vitamin D is the biological equivalent of 0.025 µg. Hence, 1,000 IU is the biological equivalent of 25 µg.

Proteinaceous Matter

In a preferred embodiment according to the invention the protein or proteinaceous content of the composition comprises a sufficient amount of protein to assure at least a protein intake of between 10 and 35 g protein, preferably between 12 and 35 and even more preferably between 15 and 30 g protein per serving. In the preferred embodiment the serving(s) are consumed at or around breakfast, since most breakfasts are low in protein, or around the moment of exercise to support muscle protein synthesis.

Alternatively, in a preferred embodiment a daily protein intake as supplemented to the older adults provides at least 0.1 g proteinaceous matter/kg body weight, preferably at least 0.15, even more preferably more then 0.2 and most preferably at least 0.25 g proteinaceous matter per kg body weight.

The source of proteinaceous matter may be provided separately, in the form of a meal, a food supplement, a drink, or in any other form or may be combined in a single nutritional composition.

The proteinaceous matter originates from high quality protein, preferably high in branched chain amino acids. Proteins such as vegetable proteins soy or pea, more preferably animal protein such as egg or dairy, even more preferably fast digestible animal protein, such as whey protein are used. The amino acids are essentially L-amino acids as only L-amino acids are metabolically relevant in the context of this invention. The protein fraction is preferably high in branched chain amino acids (leucine, valine, isoleucine) in order to stimulate muscle protein synthesis. An advantage of providing these amino acids in the form of protein is to avoid the adverse sensory impact of added amino acids, but also to create a favourable physiological response due to the high protein composition.

Preferably, the nutritional composition according to the invention comprises at least about 10 g of proteinaceous matter per serving. Preferably, the composition comprises at least about 12 g, at least about 15 g, and most preferably at least about 20 g of proteinaceous matter per serving.

According to another embodiment, the nutritional composition according to the invention comprises at least about 45 en % of proteinaceous matter per 100 kcal. Preferably, the composition comprises between 35 and 80 en % of proteinaceous matter per 100 kcal. Preferably at least about 35, 40, or 48 en %, at least about 50 en %, at least about 52 en %, at least about 54 en %, and most preferably at least about 55 en % of proteinaceous matter per 100 kcal.

According to a preferred embodiment, the proteinaceous matter according to the invention comprises between 50 and 95 weight % whey protein, preferably at least about 80 weight % of whey protein, preferably at least about 85 weight % of whey protein, preferably at least about 90 weight %, and most preferably about 95 weight % of whey protein. Whey protein is considered a fast protein referring to the rate of appearance in the circulation of the amino acids following whey ingestion. In addition, whey protein is inherently high in branched chain amino acids (leucine, valine, isoleucine) which stimulate muscle protein synthesis.

The whey protein may be provided as an intact whey protein, a hydrolysed whey protein, a microparticular whey protein, a nanoparticular whey protein, a micellar whey protein, and the like. Preferably, the whey protein is an intact whey protein, i.e. a whey protein in its intact form, such as present in fresh milk. As a source of whey protein to be used in the present invention, any commercially available whey protein source may be used, i.e. whey obtained by any process for the preparation of whey known in the art, as well as whey protein fractions prepared thereof, or in the form of proteins that constitute the bulk of the whey, i.e. being β-lactoglobulin, α-lactalbumin and serum albumin. The whey protein may be provided as liquid whey, or whey in powder form, such as whey protein isolate (WPI) or whey protein concentrate (WPC). Whey protein concentrate is rich in whey proteins, but also contains other components such as fat, lactose and glycomacroprotein (GMP), a casein-related non-globular protein. Typically, whey protein concentrate is produced by membrane filtration. On the other hand, whey protein isolate consists primarily of whey proteins with minimal amounts of fat and lactose. Whey protein isolate usually requires a more rigorous separation process such as a combination of microfiltration and ultra-filtration or ion exchange chromatography. It is generally understood that a whey protein isolate refers to a mixture in which at least 90 weight % of the solids are whey proteins. A whey protein concentrate is understood as having a percentage of whey proteins between the initial amount in the by-product (about 12 weight %) and a whey protein isolate. In particular, sweet whey, obtained as a by-product in the manufacturing of cheese, acid whey, obtained as a by-product in the manufacturing of acid casein, native whey, obtained by milk microfiltration or rennet whey, obtained as a by-product in the manufacturing of rennet casein, may be used as a source of whey proteins.

Furthermore, whey proteins may originate from all kinds of mammalian animal species, such as, for instance cows, sheep, goats, horses, buffalo's, and camels. Preferably, the whey protein is of bovine origin.

Preferably, the whey protein source is available as a powder, preferably the whey protein source is a WPC or WPI.

According to another embodiment, the proteinaceous matter according to the invention comprises at least about 45 weight % of essential amino acids (EAA), preferably at least about 47 weight %, and more preferably at least about 50 weight % of EAA. Essential amino acids are amino acids selected from the group of isoleucine (Ile), leucine (Leu), lysine (Lys), methionine (Met), phenylalanine (Phe), threonine (Thr), tryptophan (Trp), histidine (His) and valine (Val). Since native whey protein and casein protein comprise (depending on the source) maximum about 45 and 41 weight % of EAA, respectively, it may be necessary to add EAAs to the nutritional composition, such as in the form of amino acids or peptides, to arrive at the preferred amount of at least 45 weight %.

According to another embodiment, the proteinaceous matter according to the invention comprises total leucine, total valine and total isoleucine in a total leucine:valine:isoleucine weight ratio of about 1.7-3:1:1. Alternatively, the weight ratio of leucine:(valine+isoleucine) is about 0.9 or higher, preferably 1.0 or higher. Suitable valine and isoleucine levels may be provided by the whey protein, or may be provided by added amino acids, either in free form as bases or salts, or as peptides.

Surprisingly, the inventors found that essential amino acids, in particular leucine, showed an improved bioavailability of amino acids to stimulate muscle protein synthesis and subsequent muscle mass when essential amino acids were administered using a low-caloric nutritional composition. Without being bound by theory, it is hypothesized that amino acids reach the circulation faster and reach higher blood levels when dietary protein is given in a low-caloric composition compared to a high-caloric composition. While beneficial effects are observed for casein, the effects are more pronounced using whey. This so called "low-energy effect" can beneficially be used for treatment of persons on a weight loss program.

Anabolic Amino Acid

The composition of the present invention preferably involves the use of an anabolic amino acid-derived stimulus, which is defined as a chemical compound derived from or which is a precursor to an amino acid (hence, amino acid derived) which promotes (hence, anabolic) muscle growth by increasing net protein synthesis (hence, stimulus).

Preferably, the anabolic amino acid-derived stimulus is one or more selected from the group of L-leucine, β-hydroxy-β-methylbutyrate, β-hydroxy-β-methylbutyrate free acid, calcium-β-hydroxy-β-methylbutyrate, hydroxyl iso caproic acid, ketoisocaproic acid, citrulline, and creatine. Most preferably, the anabolic amino acid-derived stimulus is an amino acid selected from the group of L-leucine, β-hydroxy-β-methylbutyrate and citrulline. β-hydroxy-β-methylbutyrate and citruline have an improved effect on the palatability and hence compliance of the product compared to L-leucine. It is particularly preferred to use β-hydroxy-β-methylbutyrate or citrulline or both in concentrations higher than 1 g/100 ml. L-leucine (hereafter also called leucine, since the R-form of leucine is biologically not relevant in the context of this invention) is an essential amino acid, being part of a diverse number of proteins and, together with valine and isoleucine, belongs to the group of branched-chain amino acids. Leucine may be used as a free amino acid, or in a bound form, such as a dipeptide, an oligopeptide, a polypeptide or as part of a protein. Common protein sources of leucine are dairy proteins such as whey, casein, micellar casein, caseinate, and glycomacroprotein (GMP), and vegetable proteins such as wheat, rice, pea, lupine and soy proteins. Said sources of protein may provide intact proteins, hydrolysates or mixtures thereof, hereafter further called proteinaceous matter.

In one embodiment, anabolic amino acid is provided in a daily dosage of 1 to 10 g. In one embodiment, it is preferred to provide at least leucine. When leucine is provided as anabolic amino acid, the proteinaceous matter preferably comprises at least about 13 weight % of leucine, based on the total weight of the proteinaceous matter. Preferably, said proteinaceous matter comprises between 13 and 20 weight % of leucine. In a preferred embodiment part of the leucine may be replaced by one or more amino acid derived stimuli mentioned above, preferably anabolic amino acids selected from the group consisting of β-hydroxy-β-methylbutyrate, β-hydroxy-β-methylbutyrate free acid, calcium-β-hydroxy-β-methylbutyrate, hydroxyl iso caproic acid and ketoisocaproic acid, creatine and citrulline.

Preferably, at least about 20%, preferably at least about 22.5%, preferably at least about 25% of total leucine is provided in free form, relative to the total amount of leucine. In the context of this application, with "free form" includes a peptide comprising 1 to 5 amino acids, preferably 1 to 3 amino acids, more preferably 1 amino acid. Preferably, leucine is a free amino acid, either as a base, a salt or a chelate. It is preferred that at most 40%, more preferably at most 35% of the leucine is provided as in free form, most preferably as a free amino acid.

Citrulline is an α-amino acid. Citrulline, in the form of citrulline malate, is sold as a performance-enhancing athletic dietary supplement which was suggested to promote aerobic energy production (human study) and to increase athletic performance and decreasing muscle soreness (human study). In the human body, citrulline is produced from ornithine and carbamoyl phosphate in one of the central reactions in the urea cycle. It is also produced from arginine in the body as a by-product of the reaction catalyzed by NOS family. Citrulline is also capable of promoting muscle protein synthesis and has been described in human and animal studies [see e.g. WO 2008/049984 by Université René Descartes-Paris, 2 May 2008]. Citrulline is commercially available and can be obtained, e.g. from Ajinomoto, Kyowa, and Biocodex. In one embodiment, citrulline is provided in a daily dosage between 0.5 to 10 g, preferably between 0.8 and 8, and even more preferably between 1 and 5 g.

Creatine (N-(amino-imino-methyl)-N-methyl-glycine; methylglycocyamine) is a nitrogenous organic acid that is produced in vertebrates, in particular the human body from L-arginine, glycine, and L-methionine and helps to supply energy to muscles. Creatine is commercially available and can be obtained, e.g. from Sigma Aldrich, Alfa Aesar, and Aminolabs. In one embodiment, creatine is provided in a daily dosage of 0.5 to 20 g, preferably between 1-15, even more preferably between 1.5 and 10 g.

Preferably, the anabolic amino acid-derived stimulus is provided in a daily dosage of 0.5 to 20 g, preferably 1 to 10 g. Preferably, such daily dosage is administered as a single serving.

In one embodiment, any combination of leucine, β-hydroxy-β-methylbutyrate and citrulline, citrulline, and creatine is provided in a daily dosage of 0.5 to 20 g, preferably 1 to 10 g.

According to one embodiment, the anabolic amino acid-derived stimulus in combination with vitamin D is used for the manufacture of a medicament. In the context of this application, a medicament is an embodiment of the invention which does not, or does not substantially contain caloric components, such as carbohydrates, fat and proteinaceous matter, other than the components according to the invention.

The medicament may be administered sequentially or simultaneously with said caloric components, in particular a protein source. Said caloric components may be provided separately, in the form of a meal, a food supplement, a drink, or in any other form.

According to an alternative embodiment, the anabolic amino acid-derived stimulus in combination with vitamin D is used for the manufacture of a nutritional composition. In the context of this application, a nutritional composition is an embodiment of the invention which contains, or substantially contains caloric components, such as carbohydrates, fat and proteinaceous matter, other than the components according to the invention.

According to one embodiment, the anabolic amino acid-derived stimulus in combination with vitamin D is used in combination with a source of proteinaceous matter to provide the necessary amino acids to prevent and/or treat a loss of muscle mass, a loss of muscle function, or both, in an adult mammal.

Fat and Carbohydrates

According to a preferred embodiment, the nutritional composition according to the invention comprises at least one of a source of fat and a source of carbohydrates. The presence of one or both of these components effectively prohibits the excessive use of the protein as an energy source instead for stimulating muscle protein synthesis. Preferably the composition according to the invention comprises at least 20 en % carbohydrates and/or fat.

The total amount of energy supplied by the fat and/or carbohydrates (digestible and indigestible) preferably match the total energy supplied by the proteinaceous matter. Therefore, the total amount fat and/or carbohydrates preferably is at most about 55 en %, preferably at most about 52 en %, preferably at most about 48 en %, preferably at most about 43 en %.

In a preferred embodiment, the nutritional composition according to the invention comprises a source of fat and a source of carbohydrates, preferably in an amount of about 2 g of fat and about 6.4 g of digestible carbohydrates per 100 kcal.

With regard to the type of fat, a wide choice is possible, provided the fat is of food quality. The fat may either be an animal fat or a vegetable fat or both. Although animal fats such as lard or butter have essentially equal caloric and nutritional values and can be used interchangeably, vegetable or marine oils are highly preferred in the practice of the present invention due to their readily availability, absence of cholesterol and lower concentration of saturated fatty acids. The fat may include a source of medium chain fatty acids, such as medium chain triglycerides (MCT, mainly 8 to 10 carbon atoms long), a source of long chain fatty acids, such as long chain triglycerides (LCT) and phospholipid-bound fatty acids such as phospholipid-bound EPA or DHA, or any combination of the two types of sources. Unsaturated preferably mono-unsaturated, most preferably mono and poly-unsaturated LCT sources, such as canola oil, rapeseed oil, sunflower oil, soybean oil, olive oil, coconut oil, palm oil, linseed oil, marine oil or corn oil are beneficial because it is known that these LCTs may have beneficial effects on muscle protein synthesis and the risk of metabolic disease in the human body. In a preferred embodiment according to the invention, the composition comprises a source of long chain poly unsaturated fatty acids (lcPUFA). Preferably the PUFA comprises at least 30% alpha linolenic acid (C18, n3), eicosopentaenoic acid (EPA, C20, n3), or docosahexaenoic acid (C22, n3 DHA).

With regard to the type of carbohydrates, a wide choice is possible, provided the carbohydrates are of food quality. The digestible carbohydrates positively influence the energy level of a subject, and add to the advantageous effect of the nutritional composition according to the invention. The digestible carbohydrate may comprise either simple or complex carbohydrates, or any mixture thereof. Suitable for use in the present invention are glucose, fructose, sucrose, lactose, trehalose, palatinose, corn syrup, malt, maltose, isomaltose, partially hydrolysed corn starch, maltodextrins, glucose oligo- and poly-saccharides. More preferably sugars with a low glycemic index (GI) are used. Low GI sugars are sugars that are slowly released in the blood compared to glucose. Examples are fructose, palatinose, isomaltulose or maltodextrins. Preferably carbohydrates are used with a GI below 70.

Dietary Fibers

The composition for use according to the invention may optionally be fortified with dietary fibres or non-digestible carbohydrates such as galacto-oligosaccharides, fructooligosaccharides, inulin, and pectin (hydrolysed pectin, low-viscosity pectin (a pectin degradation product with a DP of 2-250), or other pectin degradation products). In an embodiment of the present invention, the composition according to the invention comprises 0.5 g/serving to 6 g/serving of non-digestible carbohydrates. The dietary fibres include non-digestible oligosaccharides having a DP of 2 to 20, preferably 2 to 10. More preferably, these oligosaccharides do not contain substantial amounts (less than 5 weight %) of saccharides outside these DP ranges, and they are soluble.

Preferably, the nutritional composition further comprises one or more dietary fibres, preferably having a degree of polymerization [DP] of 2 to 250, more preferably a DP of 2 to 100, more preferably DP 2-50. The composition preferably comprises one or more dietary fibres selected from the group of short chain galactooligosaccharides (GOS), preferably having a DP 2-10, preferably DP 2-8, long chain fructooligosaccharides (FOS), including inulin (preferably having an average DP 8-50), and low-viscosity pectin (preferably having an average DP 2-50). The low-viscosity providing pectin such as Herbapekt SF 50-LV has a molecular weight of about 25,000 Dalton to ensure its solubility. Due to the low viscosity it can be used in very high dosage without having a major influence on the texture of the desired product which is a beneficial effect of this type of pectin.

Medical Use

The nutritional composition according to the invention can advantageously be used for the prevention or treatment of a disease or condition involving muscle decline in an older adult mammal as defined here above, preferably an adult human participating in a weight loss program. Alternatively, the nutritional composition according to invention can advantageously be used for the prevention or treatment of a disease or condition selected from the group of sarcopenia, overweight, obesity, sarcopenic obesity, (pre)-diabetes type 2, diabetes type 2, muscle loss, insufficient muscle protein synthesis, muscle degradation, muscle proteolysis, muscle atrophy, muscle dystrophy, muscle catabolism, muscle wasting, loss of muscle strength, loss of muscle mass, loss of muscle function, loss of physical capacity, loss of physical performance, impaired mobility, pre-frailty, frailty, surgery, disability, risk of falling and risk of fall-related fractures, in an adult mammal during a weight loss program.

Experimental Evidence

Clinical study shows skeletal muscle mass preservation during a weight loss program in older adult.

Material and Methods:

Subjects

Men and women (55 to 85 y) with obesity (BMI>30 kg/m$^2$, or when BMI>28 kg/m$^2$ with waist circumference >88 cm (women) and >102 cm (men)) were recruited from the Dutch population. Subjects were excluded from participation if they had had any malignant disease during the last five years, participated in any weight loss program three months before start of the study, it was potentially unsafe to participate in the resistance training program according to a physiotherapist, or if they were not able to comply fully with study protocol.

Design and Randomization Procedure

A randomized, controlled, double-blinded, parallel-group, single-centre study design was applied. All subjects were enrolled in a 13-week hypo-caloric weight loss diet and participated in a resistance exercise program. Subjects were randomly assigned to receive one of the study products (test or control) and stratified for gender.

Hypo-Caloric Diet

All subjects followed a hypo-caloric weight loss diet of 600 kcal below estimated needs per day. This hypo-caloric advice included the consumption of 10 servings of the study product (test or control) per week throughout the 13-week intervention period. One serving had to be consumed daily just before breakfast and the other serving was consumed immediately after exercise training (3 times/week). The test product involved a nutritional supplement comprising a whey protein and was enriched with leucine. Per serving it contained 21 g total protein of which 20 g whey protein, 3 g total leucine, 10 g carbohydrates, fiber and 3 g fat, a caloric content of about 151 kcal per serving. The control product contained no protein. Taste and appearance of the control product were similar to test product and both products provided an energetic value of 150 kcal per serving in a volume of 150 mL.

Resistance Exercise Program

The resistance exercise program was performed 3 times per week for a period of 13 weeks. The training started with a short warm up and was followed by several arm, leg and core strength exercises. The number of repetitions and intensity of the training was adapted to the personal ability of the participant.

Muscle Mass and Body Composition

Appendicular skeletal muscle mass, leg lean mass, lean body mass and fat mass were measured with dual-energy x-ray absorptiometry (DXA; GE Lunar Prodigy/DPX-NT, the Diagnostic Centre Amsterdam, The Netherlands) at the start and at the end of the intervention period. To limit intra-subject variation, DXA-scans were performed at the same time during both visits. Appendicular skeletal muscle mass is defined as the sum of the lean mass (without bone) of arms and legs. Leg lean mass is defined as the sum of lean mass of the legs.

Statistics

Data analysis was performed according to the intention-to-treat principle. Baseline characteristics were compared by independent sample t-tests or Fisher's exact tests. The parameters appendicular muscle mass, leg muscle mass, lean body mass, fat mass (all measured with DXA) were analyzed using ANOVA with intervention as fixed effect and baseline and gender as co-variates. All other parameters were analyzed using a mixed model including time, intervention and time*intervention as fixed factors, subject as random factor and baseline and gender as co-variates. Within group differences were estimated using a comparable mixed model within each intervention group separately. Data are expressed as estimated marginal means (EMM) with SE derived from the linear models, unless otherwise stated. Statistical significance was defined as a two-tailed P<0.05.

Results:

Subject Characteristics

Subject characteristics are presented in Table 1 and showed no significant differences between groups.

TABLE 1

Subject characteristics in means (sd) unless otherwise specified

| Parameter | Control group (n = 40) | Test group (n = 40) | P value |
| --- | --- | --- | --- |
| Sex (N,% male) | 16 (40%) | 16 (40%) | 1.000 |
| Age (years) | 62.6 (5.76) | 63.3 | 0.538 |
| Type 2 Diabetes | 6 | 3 | |
| Current smoker (n, %) | 5 (13%) | 4 (10%) | 1.000 |
| Alcohol abstainers (n,%) | 11 (28%) | 9 (23%) | 0.797 |
| Alcohol consumption among users | 1.41 (0.78) | 1.60 | 0.440 |
| Height (m) | 1.68 (0.07) | 1.70 | 0.287 |
| Weight (kg) | 94.0 (14.8) | 95.9 | 0.992 |
| BMI (kg/m$^2$) | 33.3 (4.4) | 33.3 (4.5) | 0.807 |
| Waist circumference (cm) | 110 (11.0) | 111 | 0.643 |
| Appendicular muscle mass DXA | 22.5 (5.04) | 22.5 | 0.959 |
| Leg muscle mass DXA (kg) | 16.7 (3.48) | 16.5 | 0.835 |
| Lean body mass DXA (kg) | 51.4 (10.7) | 51.9 | 0.842 |
| Fat mass DXA (kg) | 38.6 (10.2) | 39.9 | 0.552 |

Body Weight, BMI and Waist Circumference

Both groups showed a reduction in body weight after 13 weeks of intervention (control: −2.47±0.56 kg, p<0.001 and test group: −2.83±0.54 kg, p<0.001). Both groups showed significant reductions over time for BMI following 13 weeks of intervention (control group: −0.84±0.18 kg/m$^2$, p<0.001 and test group: −0.99±0.18 kg/m$^2$, p<0.001). Waist circumference significantly decreased in the control group as well as in the test group following 13 weeks of intervention (control group: −3.73±0.83 cm, p<0.001 and test group: −4.42±0.83 cm, p<0.001). It showed that body weight, BMI and waist circumference did not differ between groups following 13 weeks of intervention (Table 2). Overall, the weight loss program resulted in significant decreases in body weight, BMI and weight circumference over time.

TABLE 2

Body weight, BMI and waist circumference

|  | Control group | | Test group | | Intervention effect |
| --- | --- | --- | --- | --- | --- |
|  | Wk 0 | Wk 13 | Week 0 | Wk 13 | P value |
| Body weight (kg) | 94.0 ± 2.3 | 91.6 ± 0.5 | 95.8 ± 2.0 | 93.0 ± 0.5 | 0.7 |
| BMI (kg/m$^2$) | 33.3 ± 0.7 | 32.4 ± 0.2 | 33.3 ± 0.7 | 32.3 ± 0.2 | 0.7 |

TABLE 2-continued

Body weight, BMI and waist circumference

|  | Control group | | Test group | | Intervention effect |
| --- | --- | --- | --- | --- | --- |
|  | Wk 0 | Wk 13 | Week 0 | Wk 13 | P value |
| Waist circumference (cm) | 109.8 ± 1.7 | 106.1 ± 0.8 | 110.9 ± 1.8 | 106.4 ± 0.8 | 0.8 |

Intention to treat data were analysed using mixed model analysis including time, intervention and time*intervention as fixed factors, subject as random factor and baseline and gender as co-variate. Data represent EMM±SE (n=80).

Surprising Effect on Body Composition (Dxa) After 12 Weeks of Intervention

13 Weeks of lifestyle intervention resulted in significant loss of fat mass in both groups (Table 3). Calculating the ratio of fat mass loss and lean body mass loss over the total weight loss revealed a high percentage loss of fat mass in the test group simultaneous with a low percentage loss of lean body mass, while the placebo group had a much higher loss of lean body mass (FIG. 1). The effect on lean body mass was further detailed by measuring the specific muscle mass of the appendicular skeletal muscles and the leg muscles. This is an unexpected effect of the product according to the invention, clearly having effect over exercise. This surprising result forms the basis of the present invention as claimed.

Figure 2:
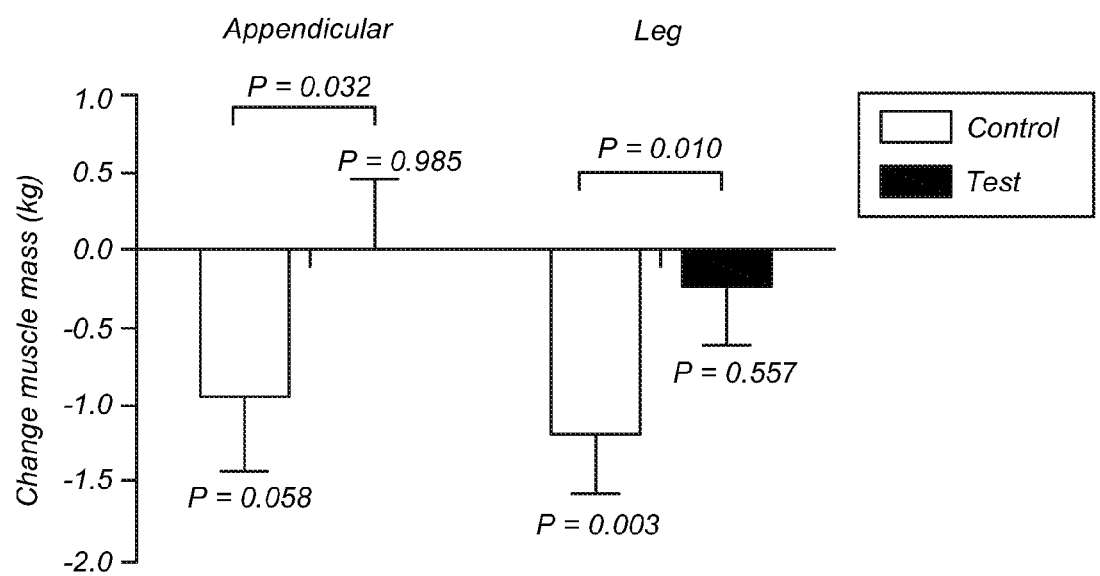
FIG. 2 shows that the intention to treat data for appendicular muscle mass and leg muscle mass were analysed using ANOVA with intervention as fixed effect and baseline and gender as co-variates. Data represents EMM±SE (n=80).

The results are shown in FIG. 2. FIG. 2 shows there was a decline in appendicular and leg muscle mass over time were measured in the control group, while the muscle mass of the test group did not significantly change. Muscle mass in the test group was statistically significant less decreased compared to muscle mass in the control group. The 13 week weight loss program resulted in significant loss of appendicular (p=0.058) and leg muscle mass (p=0.003) in the control group, while supplementing the subjects with the test product did not show significant loss of appendicular or leg muscle mass (FIG. 2). In addition, the test product preserved appendicular and leg muscle mass over the time of the intervention compared to the test product as shown by the time*intervention analyses ((p=0.032 and p=0.01, respectively, FIG. 2).

In conclusion, consumption of the test product during the weight loss program preserves skeletal muscle mass and might therefore reduce the risk for sarcopenia in adults with overweight or obesity.

TABLE 3

Body composition (Dxa measurements)

|  | Control group | | Test group | | Time effect Control | Test | Intervention effect |
| --- | --- | --- | --- | --- | --- | --- | --- |
|  | Week 0 | Wk 13 | Week 0 | Wk 13 | p value | p value | p value |
| Fat mass (kg) | 38.6 ± 1.6 | 36.6 ± 0.6 | 39.9 ± 1.4 | 37.2 ± 0.6 | 0.001 | <0.001 | 0.319 |
| Lean body mass (kg) | 51.3 ± 1.6 | 50.8 ± 0.4 | 51.9 ± 1.7 | 51.72 ± 0.3 | 0.112 | 0.679 | 0.165 |

Intention to treat data were analysed using ANOVA with intervention as fixed effect and baseline and gender as co-variates. Data represent EMM±SE (n=80).

Examples of Nutritional Compositions:

According to one embodiment, the invention concerns a solid nutritional composition, suitable as a supplement within a calorie restriction protocol to preserve or stimulate muscle mass during a weight loss program, comprising per 100 g of dry matter:
About 378 kcal
About 52 g of proteinaceous matter comprising about 90 weight % of whey protein, relative to the total proteinaceous matter, and which comprises about 13 weight % of leucine, relative to the total proteinaceous matter, of which about 25 weight % is in a free form, relative to the total leucine.
About 7.5 g of fat of which 5.5 g unsaturated, about 3.2 g soluble fibre and about 24 g of carbohydrates
About 50 μg Vit D3, 19 mg vitamin E, about 500 μg Folic Acid, about 7.5 μg Vitamin B12, about 1250 mg Calcium, about 630 mg Phosphorus, other vitamins and micronutrients at or below Food for special medical purposes (FSMP) regulation.

According to one embodiment the invention concerns a nutritional composition, suitable as a meal replacement in a caloric restriction setting for preservation or stimulation of muscle mass during a weight loss program, comprising per serving:
200 kcal
40 energy % protein
About 90% of the proteinaceous matter comprising of whey protein, with >13% leucine
6.5 g of fat, of which at least 1 g linoleic acid
16 g carbohydrates with 12 g as digestible carbohydrates and preferably more than 50% classified as low GI sugar, such as, but not limited to: fructose, isomaltulose, lactose, in addition 4 g of fibre, wherein the fibre is at least one selected form the group consisting of galactooligosaccharide (GOS), Fructooliogosaccharide (FOS), inulin and pectin.

800 IU Vitamin D, and other vitamins and micronutrients at or above EFSA regulation directive 96-8

According to a further embodiment the invention concerns a nutritional composition, suitable as snack replacer in a weight loss therapy for preservation or stimulation of muscle mass during a weight loss program, comprising per serving:

125 kcal 38-60 energy % protein, at least 90% of the proteinaceous matter comprising of whey protein and at least 13 wt % leucine of the total proteinaceous matter 2 g fat, preferably more than 30% unsaturated 7 g of carbohydrates with a source of digestible carbohydrates containing preferably more than 50% of the digestible carbohydrate fraction consisting of low glycemic index sugars, such as, but not limited to, fructose, isomaltulose or lactose 2 g of fibre 2.5 µg or higher Vitamin $D_3$ Optionally additional vitamins and minerals According to a further embodiment the invention concerns a nutritional composition, suitable as a complete meal replacer for preservation or stimulation of muscle mass during a weight loss comprising per serving:

300 kcal 35 energy % proteinaceous matter

80% of the proteinaceous matter comprising of whey protein, and supplemented with leucine to a total of at least 13 wt % leucine of the total proteinaceous matter 10 g of fat, of which at least 50 wt % is unsaturated 30 g carbohydrates with 25 g as digestible carbohydrates and preferably more than 50% classified as low GI sugar, such as, but not limited to: fructose, isomaltulose, lactose, in addition 5 g of fibre with preferably a mix of soluble and insoluble fibers 800 IU Vitamin $D_3$ and 1000 mg calcium Optionally additional vitamins and minerals.

The invention claimed is:

1. A method for maintaining muscle mass, stimulating muscle mass increase, or reducing the risk of sarcopenia in obese or overweight adults of at least 40 years of age participating in a weight loss program, the method comprising daily feeding the obese or overweight adult in conjunction with a weight loss program, the weight loss program comprising a physical exercise regimen having resistance exercise and a hypocaloric dietary regimen, 25-100 g dry weight of a nutritional composition having an energy density between 200 and 500 kcal per 100 g dry weight of the composition and comprising:
(a) between 45 and 55 wt % proteinaceous matter, comprising 50-95 wt % whey protein, based on total proteinaceous matter, and comprising between 0.5 and 4 wt % leucine as free amino acid, peptide and/or salt based on dry weight of the composition,
(b) less than 50 wt % carbohydrates,
(c) between 5 and 75 microgram vitamin D.

2. The method according to claim 1, wherein the nutritional composition comprises per serving between 50 and 300 kcal.

3. The method according to claim 1, wherein the nutritional composition comprises per serving between 10 g and 35 g proteinaceous matter comprising 50-95 wt % whey protein and at least 13 wt % leucine, based on proteinaceous matter; and at least 2.5 microgram vitamin D.

4. The method according to claim 1, for the treatment or prevention of muscle mass decrease, or stimulation of muscle mass preservation.

5. The method according to claim 1, wherein the adults suffer from a disease or condition selected from the group consisting of sarcopenia, obesity, sarcopenic obesity, pre-diabetes type 2, diabetes type 2, pre-frailty or frailty.

6. The method according to claim 1, wherein the hypocaloric dietary regimen comprises a daily energy uptake of less than the daily energy expenditure (TEE) of the adults.

7. The method according to claim 1, wherein the treatment comprises a daily dose of 1 to 4 servings.

8. The method according to claim 1, wherein the hypocaloric dietary regimen comprises a daily energy uptake of less than the daily energy expenditure (TEE) of the adult of at least 40 years of age, wherein TEE is assessed by means of the doubly labeled water method (TEEDLW).

9. The method according to claim 8, wherein the hypocaloric dietary regimen provides 50-95% of the TEE of the obese or overweight adult.

10. The method according to claim 9, wherein the hypocaloric dietary regimen provides 60-90% of the TEE of the obese or overweight adult.

11. The method according to claim 10, wherein the hypocaloric dietary regimen provides 70-90% of the TEE of the obese or overweight adult.

12. The method according to claim 1, wherein the serving is administered as a single shot wherein the serving is consumed within 15 minutes.

13. The method according to claim 12, wherein the serving is administered as a single shot wherein the serving is consumed within 10 minutes.

14. The method according to claim 13, wherein the serving is administered as a single shot wherein the serving is consumed within 5 minutes.

15. The method according to claim 1, wherein between 13 and 20 wt % of the total proteinaceous matter is leucine.

16. The method according to claim 1, wherein the composition comprises per serving at least 0.5 gram of at least one compound selected from the group consisting of free leucine, salts of free leucine, or metabolites of leucine, or salts of metabolites of leucine.

17. The method according to claim 16, wherein the metabolite is selected from the group consisting of β-hydroxy-β-methylbutyrate, β-hydroxy-β-methylbutyrate free acid, calcium-β-hydroxy-β-methylbutyrate, hydroxyl iso caproic acid and ketoisocaproic acid.

18. The method according to claim 1, wherein the free leucine, salts thereof or its metabolites are encapsulated.

19. The method according to claim 1, wherein the composition further comprises at least 20 en % carbohydrates and/or fat.

20. The method according to claim 1, wherein the carbohydrate comprises of at least 10 wt % based on the total carbohydrate matter of a carbohydrate with a glycemic index below 70.

21. The method according to claim 1, wherein the fat source comprises at least 30 weight % of unsaturated fatty acids and at least 15 weight % of polyunsaturated acids of total fat in the composition.

22. The method according to claim 1, wherein the proteinaceous matter comprises at least 60 wt % mammalian whey.

23. The method according to claim 22, wherein the mammalian whey is bovine whey.

24. The method according to claim 1, wherein the carbohydrate comprises dietary fiber.

25. The method according to claim 24, wherein the serving comprises between 0.5 and 6 gram dietary fiber comprising at least one fiber selected from the group consisting of galactooligosaccharides (GOS), fructooligosaccharides (FOS), inulin and pectin oligosaccharides.

26. The method according to claim 1, wherein the nutritional composition comprises between 2 and 15 wt % dietary fiber comprising galactooligosaccharides (GOS), fructooligosaccharides (FOS) and/or pectin oligosaccharides.

* * * * *